(12) United States Patent
McMeekin et al.

(10) Patent No.: US 6,461,679 B1
(45) Date of Patent: Oct. 8, 2002

(54) BEARING MATERIAL

(75) Inventors: Kenneth MacLeod McMeekin, Riccarton (GB); Johnston Janette, Riccarton (GB)

(73) Assignee: Glacier Garlock Bearings, Inc., Wilmington, DE (US)

( * ) Notice: Subject to any disclaimer, the term of this patent is extended or adjusted under 35 U.S.C. 154(b) by 0 days.

(21) Appl. No.: 09/762,336
(22) PCT Filed: Jul. 28, 1999
(86) PCT No.: PCT/GB99/02461
§ 371 (c)(1),
(2), (4) Date: Mar. 16, 2001
(87) PCT Pub. No.: WO00/08346
PCT Pub. Date: Feb. 17, 2000

(30) Foreign Application Priority Data

Aug. 7, 1998 (GB) .............................................. 9817249

(51) Int. Cl.⁷ .............................. B05D 3/12; B05D 3/02
(52) U.S. Cl. ........................ 427/369; 427/355; 427/370; 427/375; 427/384
(58) Field of Search ................................ 427/355, 359, 427/369, 370, 375, 384; 428/547, 548, 550, 551; 384/26; 508/106

(56) References Cited

U.S. PATENT DOCUMENTS

| | | | | |
|---|---|---|---|---|
| 4,575,429 A | * | 3/1986 | Jacobson | 252/12 |
| 4,626,365 A | * | 12/1986 | Mori | 252/12 |
| 4,732,818 A | * | 3/1988 | Pratt et al. | 428/547 |
| 4,865,922 A | * | 9/1989 | Davies | 428/551 |
| 6,390,682 B1 | * | 5/2002 | McMeekin et al. | 384/276 |

FOREIGN PATENT DOCUMENTS

| | | |
|---|---|---|
| DE | 41 42 287 A | 6/1993 |
| DE | 196 10 054 A | 9/1997 |
| EP | 0 183 375 A | 6/1986 |
| EP | 0 581 185 A | 2/1994 |
| GB | 2 196 876 A | 5/1988 |
| GB | 2 349 923 A | 11/2000 |
| JP | 01 299316 A | 12/1989 |
| JP | 02 245085 A | 9/1990 |
| WO | WO 95/02772 | * 1/1995 |
| WO | WO 95 02772 A | 1/1995 |
| WO | WO 96 26975 A | 9/1996 |
| WO | WO 97 28380 A | 8/1997 |

OTHER PUBLICATIONS

Derwent English abstracts of DE 196 10 054 A and DE 41 42 287 A.
Delphion English abstracts of JP 01 299316 A and JP 02 245085 A.
International Search Report, 3 pages.

* cited by examiner

Primary Examiner—Michael Barr
(74) Attorney, Agent, or Firm—John M. Harrington; Kilpatrick Stockton LLP

(57) ABSTRACT

A bearing material and a method for the production thereof are described. The bearing material comprising a matrix of polytetrafluoroethylene having dispersed therein in volume %: a melt-processable fluoro-polymer in the range from 2 to 10; an inorganic particulate filler material in the range from 10 to 30; and, up to 5 of a ceramic particulate material.

12 Claims, 5 Drawing Sheets

(Fig.1G.) →

BEARING MATERIAL

The present invention relates to a plastics bearing material, to that material applied to a strong backing material to form bearings and to a method for the production thereof.

Many different types of plastics bearing materials comprising a plastics matrix and having various fillers and applied to a strong backing material such as steel having a porous bonding interlayer composed of bronze particles sintered to the steel are known. One such material comprises polytetrafluoroethylene (PTFE) having therein lead particles, the material being impregnated into the porous bronze interlayer described above to leave a thin layer, generally less than 25 µm, above the upper surface of the bronze interlayer. The material is made by mixing an aqueous dispersion of the PTFE with the filler material together with an organic lubricant such as toluene; coagulating the dispersion to form a so-called "mush" and decanting off the water; spreading the wet mush on the backing material; applying pressure to the mush so as to impregnate the mush into the porous layer; heating to drive off the residual water and lubricant; and, finally heating the material at a temperature above the melting point of the PTFE to sinter the PTFE particles together. The need to drive off the residual water limits the thickness of the layer which may be formed above the porous interlayer due to the resultant blistering which occurs when thicker layers are attempted. However, even when the surface layer is limited to the generally accepted 25 µm or so, microscopic examination of the sintered bearing material reveals porosity in the bearing material itself.

Generally, such porosity does not normally matter in most engineering applications for which this type of material is used since the load application is usually static, i.e. applied in one direction, and at loads well within the capability of the material to withstand.

More recently such plastics bearings have been used in engineering applications where the load is dynamic, i.e. the load application direction constantly changes and the load applied to the axial length of a generally cylindrical bearing bush -is non-uniform in that edge-loading at the ends of the bush occurs. One such application is in hydraulic gear pumps which are used in many different applications including automotive vehicles. With the increasing complexity and sophistication of all types of vehicles, such gear pumps may be used in many different applications in one vehicle and may include for example the engine oil pump; power steering pump; pumps to adjust seat position and many more. The construction of such pumps generally comprises two intermeshing gears which are each supported on stub shafts at each axial end, the stub shafts themselves being supported in bearing bushes of the type described above which are held in a housing forming the body of the fluid pump. Plastics bearing materials used in these applications have been failing. The mode of failure appears to be due to the fact that the oil, for example, being pumped between the meshing gear teeth exerts a high load tending to push the gears away from each other and thus causing bending and deflection of the supporting stub shafts in their supporting bearing bushes causing side-edge loading at the bush ends. The result of this deflection induced loading is to cause some of the bearing material per se to creep over the chamfer on the end face at the point of greatest loading and a crack is initiated adjacent the chamfered edge. The crack then propagates into the bearing bush bore due to the oil pressure differential between the ends of the bearing bush. Oil under pressure then washes through the crack so formed and erosion of the bearing lining occurs. The cause of the initial creeping of the polymer material over the chamfered end edge has been identified as a lack of sufficient strength in the lining material itself, due in part to the porosity present in the plastics lining material.

An improved bearing material in this particular application of gear pumps is described in GB-B-2 196 876. The material described comprises tetrafluoroethylene resin and tetrafluoroethylene-hexafluoropropylene copolymer and/or tetrafluoroethylene-perfluoroalkylvinylether copolymer with a filler of lead-tin metal alloy, the material being impregnated into a porous bronze sintered interlayer on steel as described above. Whilst this material constitutes a distinct improvement over other known materials in gear pump applications, it suffers from the disadvantage that it contains lead which is ecologically undesirable especially when the time comes for engines and components utilising lead containing bearings to be scrapped.

It is an object of the present invention to provide a bearing material having improved flow and cavitation erosion resistance and wear and fatigue resistance whilst retaining low friction properties comparable with existing materials and to avoid the use of lead.

It is a further objective to provide such a bearing material at a manufacturing cost comparable with or lower than existing materials.

According to a first aspect of the present invention, there is provided a bearing material comprising a matrix of polytetrafluoroethylene having dispersed therein in volume %: a melt-processable fluoro-polymer in the range from 2 to 10; an inorganic particulate filler material in the range from 10 to 30; and, up to 5 of a ceramic particulate material.

The melt-processable fluoro-polymer may be only melt processable fluoro-polymer which is available in aqueous dispersion and may be selected, for example, from one or more of the group comprising; monofluoroalkoxy (MFA); fluorinated ethylene propylene (FEP); and perfluoro alkyl vinyl ether (PFA). However, MFA is preferred.

Preferably, the melt-processable fluoro-polymer is present in the range from 4 to 8 vol %.

The melt-processable fluoro-polymer increases the toughness of the plastics material matrix and improves cavitation erosion resistance.

The inorganic particulate filler may include at least one material selected from the group comprising: calcium fluoride; magnesium fluoride; strontium fluoride; metal oxides including for example, iron oxide, aluminium oxide, titanium dioxide; and, metal hydroxides such as aluminium hydroxide. Any material known in the prior art as being suitable as a filler material for plastics bearing materials may be employed. However, calcium fluoride is the preferred material.

Preferably, the particle size of the inorganic filler material may lie in the range from 0.1 to 10 µm. More preferably, the particle size may lie in the range from 0.5 to 5 µm.

Preferably, the inorganic filler is present in the range from 15 to 25 vol %.

The ceramic particulate filler may include at least one material selected from the group comprising: alumina; silica; zirconia and diamond, for example. However, alumina is the preferred material.

The ceramic particulate filler material is preferably present as particles of less than 100 nanometers and more preferably, of less than 50 nanometers (i.e. less than 0.1 µm and more preferably less than 0.05 µm).

Preferably the content of ceramic material lies in the range from 0.5 to 3.5 vol %.

Although it is possible for materials per, se to be duplicated in the inorganic filler and in the ceramic filler (e.g.

alumina could be present as both the inorganic filler and the ceramic filler), the particle sizes of the two constituents are different as noted above. It is believed that the inorganic filler helps to support the load and improves wear resistance of the bearing whereas the ceramic filler increases material strength and improves cavitation erosion resistance of the polymer matrix.

According to a second aspect of the present invention, there is provided a method for the manufacture of a bearing material, the method comprising the steps of: mixing an aqueous dispersion of polytetrafluoroethylene with 2 to 10 vol % of an aqueous dispersion of a melt-processable fluoro-polymer, 10 to 30 vol % of a particulate inorganic filler material and up to 5 vol % of a particulate ceramic material; co-coagulating the PTFE and the melt-processable fluoro-polymer; removing excess water; at least partially drying the wet co-coagulated material; spreading said at least partially dried material particles onto a substrate to form a bearing material layer; compacting said layer; drying said compacted layer to drive off residual liquid; and, sintering said dried, compacted layer at a temperature above the melting point of said PTFE constituent.

In the co-coagulation step the inorganic and ceramic filler particles are encapsulated by the PTFE and melt processable fluoro-polymer. A further advantage of the small particle size of the ceramic particulate filler constituent is that it acts as a coagulant per se.- Thus, the addition of a separate coagulant material such as aluminium nitrate, for example, may be avoided consequently making the manufacture of the material simpler and more economic.

After decanting off the excess water, the wet, coagulated material must be at least partially dried to remove the bulk of the remaining water. However, some water may be left in the resulting coagulated material and which acts as a lubricant to the constituent powder particles during spreading and compaction onto the substrate. Preferably, a small amount of additional lubricant may be added to ensure acceptable spreading and compaction properties. The lubricant may be a hydrocarbon liquid for example.

Alternatively, the coagulated material may be substantially completely dried and a separate lubricant liquid such as a hydrocarbon added to lubricate the dried powder particles in the spreading and compaction steps.

In the above method of the present invention, the content ranges given for the constituents of the bearing material are to be construed as those ranges existing in the final bearing material after sintering.

In a preferred embodiment of the present invention, the substrate on which the powder and lubricant mixture is spread may be a metal strip on which is provided a porous layer into which the spread layer is impregnated. The porous layer may be bronze particles sintered to a metal backing such as steel, for example, as is known in the art. In this way a strip bearing material may be formed from which cylindrical or semi-cylindrical bearings, for example, may be produced by known methods.

The partially dried powder or powder and lubricant mixture may be compacted- or impregnated into the porous layer by means of a compacting rolling mill for example.

The metal backed bearing material so formed may be given a final size rolling operation to produce a material having an accurate wall thickness.

A particular advantage of the bearing material of the present invention is that it is substantially porosity free due to the fact that the majority of the water from the initial aqueous dispersions is removed at an early stage in the process and in any event prior to compaction into a substantially solid form. Thus, after compaction, only a relatively small amount of water and/or the relatively much more volatile lubricant need be removed and which causes no porosity and importantly allows the formation of a substantially thicker surface layer of up to about 100 $\mu$m above the porous bonding layer with no blistering. As a direct consequence of the method of the present invention, a plastics bearing lining may be produced which is boreable to allow accurate sizing by machining. Conventional mush route materials blister when surface layers of more than 40$\mu$m are attempted.

The powder after at least partial drying comprises particles containing the aforesaid constituents of the bearing material in substantially homogeneous distribution.

In an alternative embodiment, instead of spreading the powder onto a substrate, the mixture may for example be extruded to form a monolithic tape or strip which may be dried and sintered as described above.

In the method of the present invention, all constituents of the material are preferably mixed together simultaneously prior to co-coagulation. It has been found that simultaneous mixing of all components produces more homogeneous granules of the powder.

In the present invention the small particle size of the ceramic filler material effectively acts as a coagulant itself. However, this does not preclude the addition of a separate coagulating agent if desired as a processing aid.

In order that the present invention may be more fully understood, an example will now be described by way of illustration only with reference to the accompanying drawings, of which:

Figure 1A:
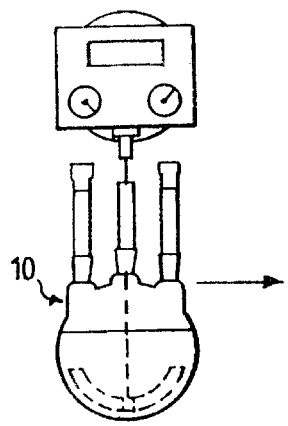
FIG. 1 shows a schematic showing the steps of a manufacturing process for a bearing material according to the present invention.
Figure 1B:
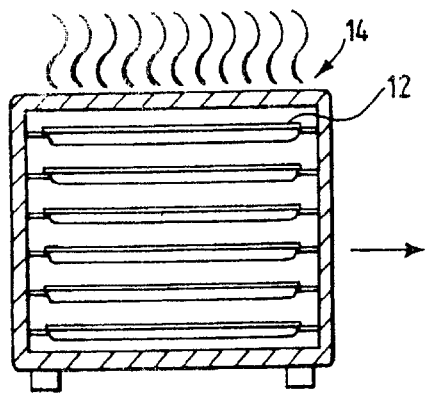
Figure 1C:
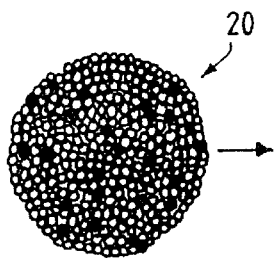
Figure 1D:
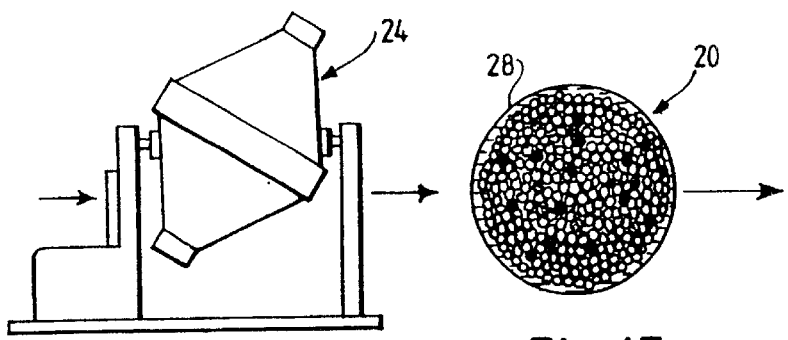
Figure 1E:
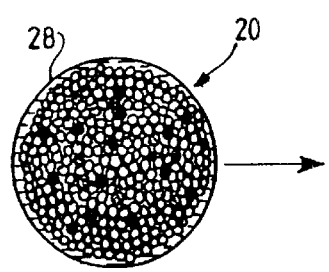
Figure 1F:
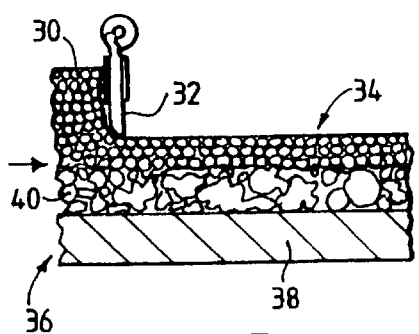
Figure 1G:
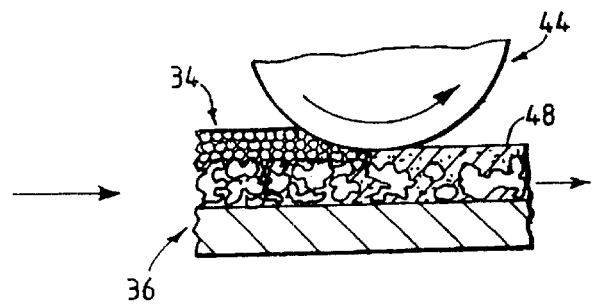
Figure 1H:
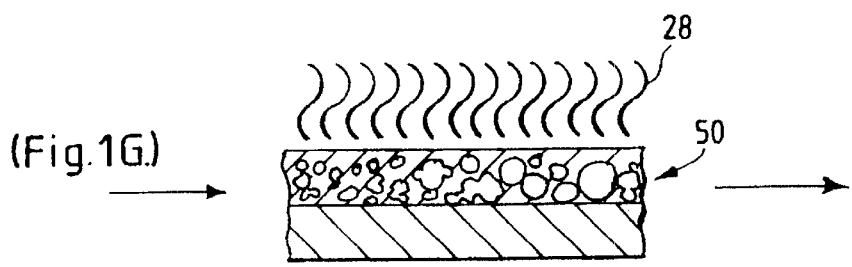
Figures 1I, 1J:
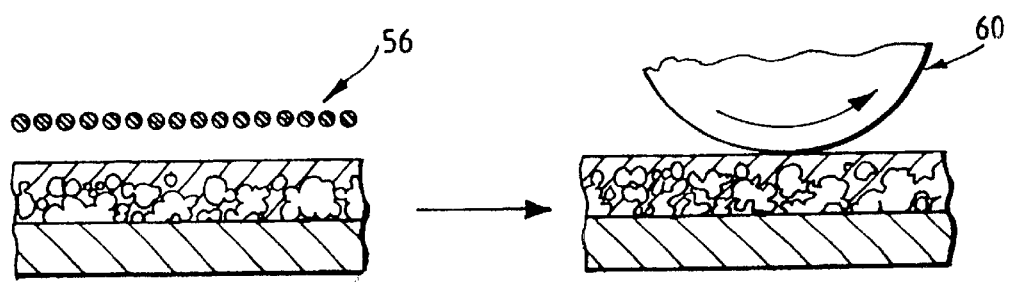

Referring now to FIG. 1 which shows schematically the production steps in the manufacture of a bearing material according to the present invention, the material having a final sintered composition of: PTFE; 5 vol % MFA; 19 vol % calcium fluoride; 2 vol % alumina.

An aqueous dispersion of unstabilised PTFE was mixed with the appropriate quantity of an aqueous dispersion of MFA, calcium fluoride powder and colloidal alumina in an aqueous dispersion in a stirring mixer 10 (Step A).

The turbulence in the mixer causes the PTFE and other constituent particles to come into contact, the PTFE particles sticking together and increasing in size and taking the inorganic and ceramic filler particles with them to result in co-coagulation. Excess water was drained off the co-coagulated material and the wet solid was transferred to trays 12 in a drying oven 14 (Step B). This results in a dry powder comprising particles 20 which include all of the mix constituents (Step C). The dried powder is then mixed with a hydrocarbon lubricant in a mixer 24 (Step D). This results in a powder comprising the particles 20 having the lubricant 28 absorbed onto the surface of the powder particles and into the interstices of the particles (Step E). The powder/lubricant mixture 30 is then transferred to a spreading die 32 to deposit a layer 34 of predetermined thickness onto a substrate 36. The substrate 36 comprises a steel backing 38 having a known porous layer 40 of sintered bronze particles thereon (Step F). The substrate 36 and layer 34 is then passed through a rolling mill 44 which causes the layer 34 to be both compacted and also to be impregnated into the porosity of the layer 40 to leave a thin layer 48 above the bronze surface (Step G). The impregnated strip 50 is then heated gently by passing through a drying oven (not shown) to drive off the lubricant 28 (Step H). The dried strip 50 is then passed through a sintering oven 56 under conditions which equate to a sintering time of about 10 minutes at about 380° C., such as through an induction heating oven for example (Step I). The thus sintered strip is then passed through a second rolling mill 60 to effect a size rolling operation to the strip 50 to produce an accurate overall wall thickness (Step J).

Figure 4:
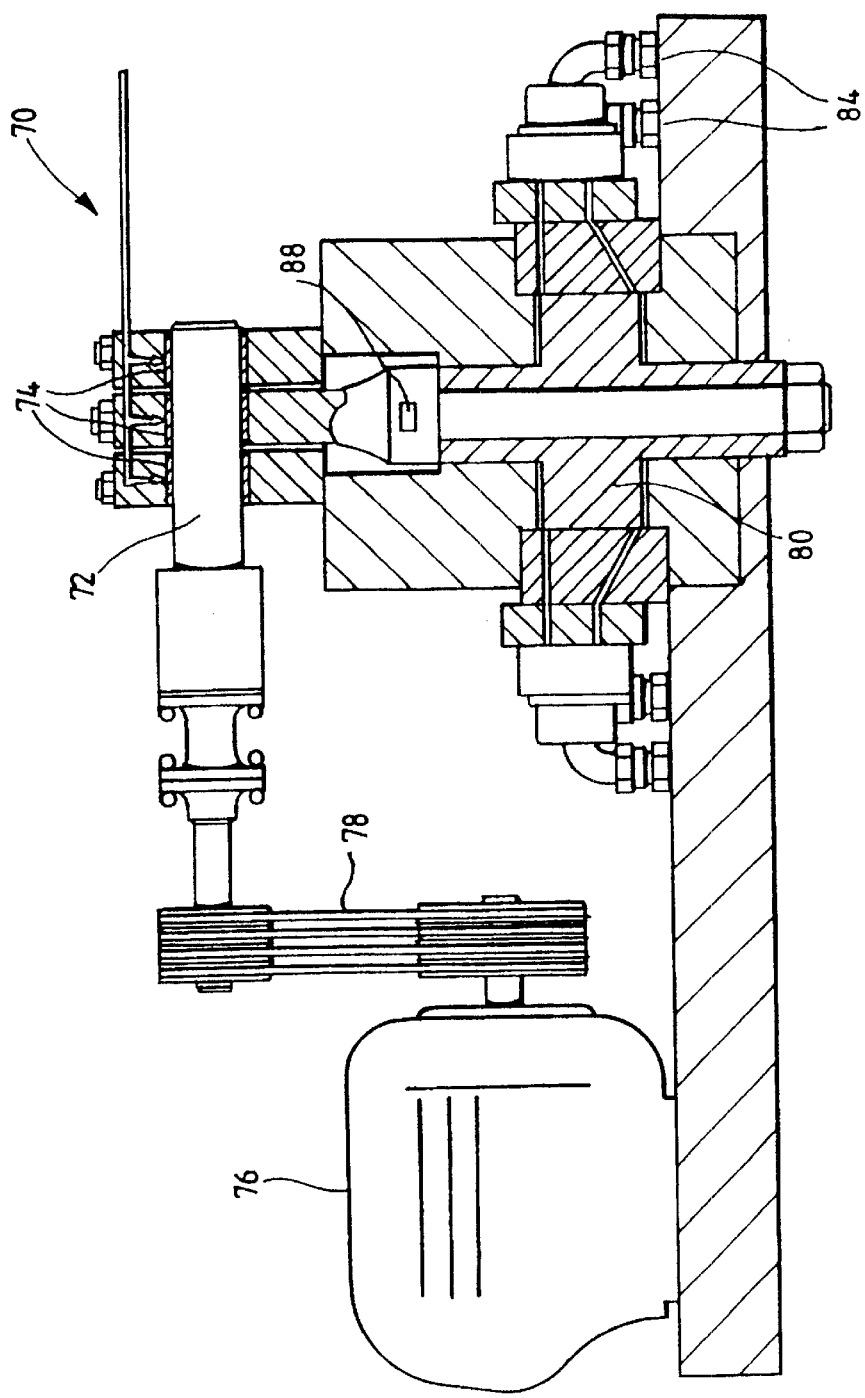
FIG. 4 which shows a schematic view of a "Vulcan" test apparatus used to produce the results shown in FIGS. 2 and 3.

The strip material 50 so produced was formed into bearing bushes and tested on a known "Vulcan" (trade name) test apparatus 70 as shown in FIG. 4. The test apparatus 70 comprises a test shaft 72 running in bearings 74 to be tested and driven by an electric motor 76 via vee-belts 78. Load is applied to the bearings 74 by a load cylinder 80 to which the actual load is applied hydraulically by a pump (not shown) via control valves 84. Load at the bearings is measured by strain gauges 88.

Figure 2:
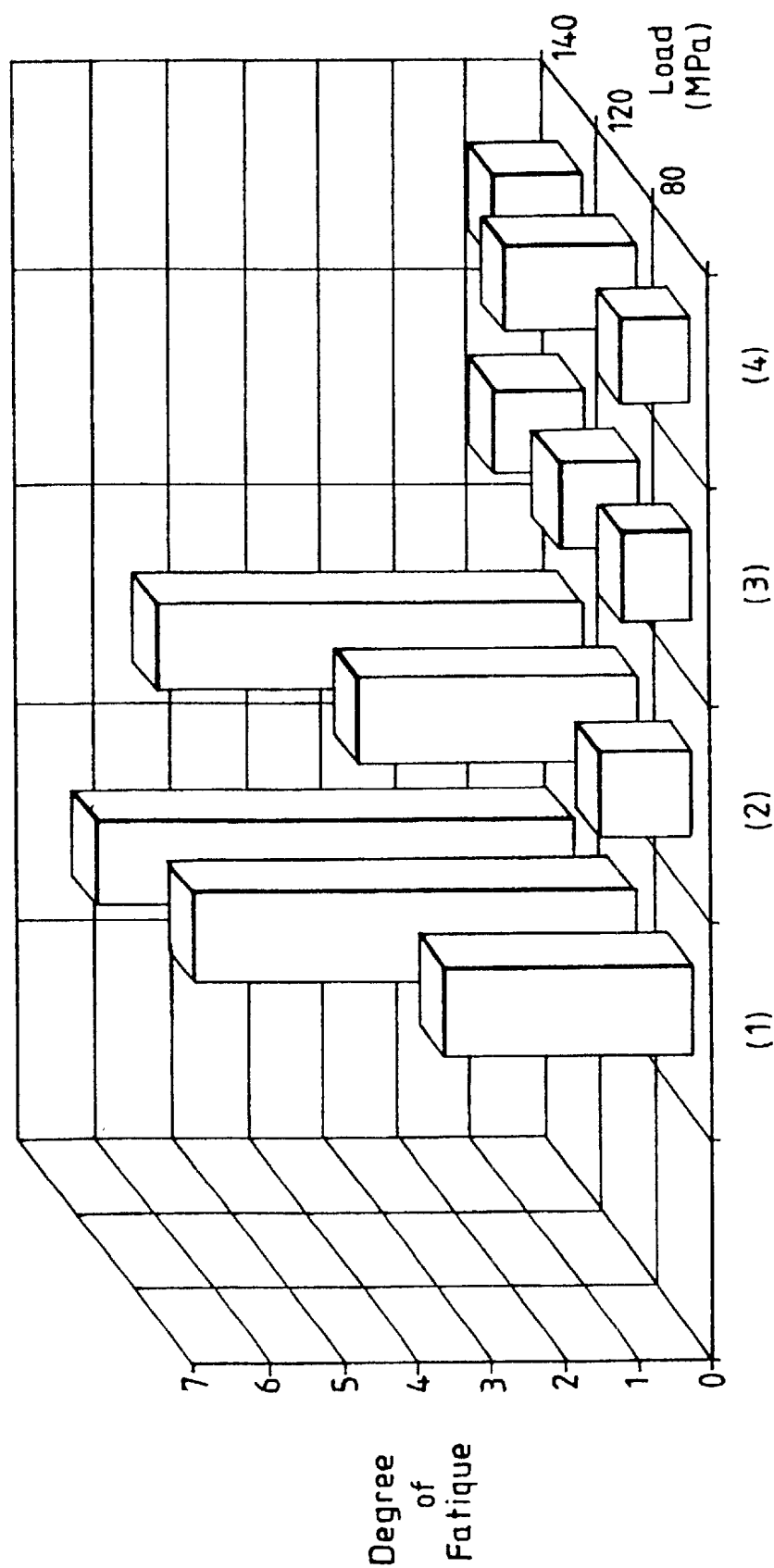
FIG. 2 shows a bar chart showing fatigue properties of a material according to the present invention compared with other known materials.
Figure 3:
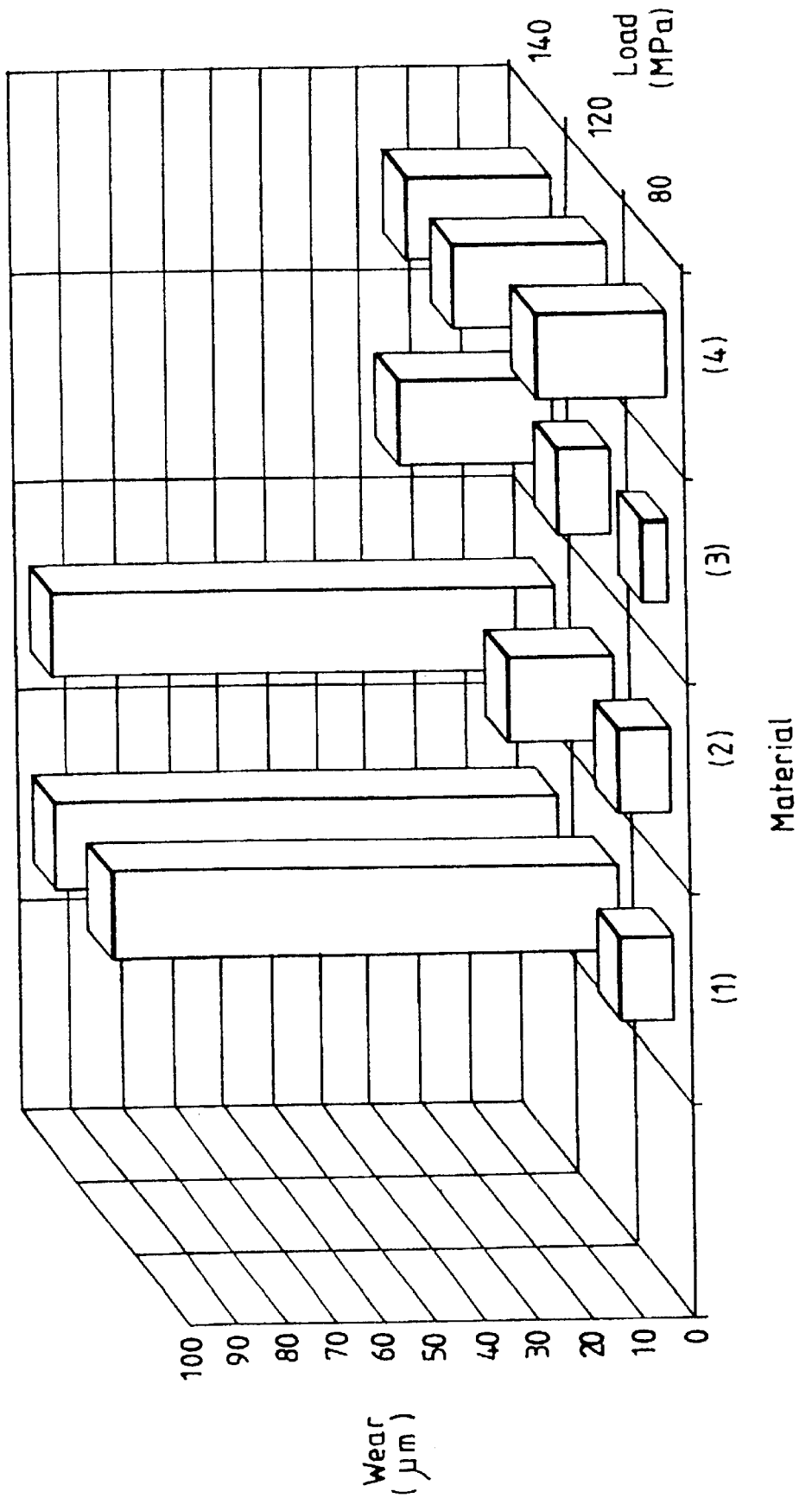
FIG. 3 shows a bar chart showing wear properties of the same materials as in FIG. 2.

The test conditions were: a shaft speed giving a surface rubbing speed of 4.95 m/sec; load conditions as shown in FIGS. 2 and 3. Degree of fatigue was assessed by comparison with known standards.

The materials used in the test were:

(1) 78 PTFE; 20 $CaF_2$; 2 Kevlar (trade name)

(2) 71 PTFE; 7 FEP; 18 $CaF_2$; 4 Kevlar (Trade name)

(3) A material according to the present invention and as described above; and (4) A commercially available material known as NDC FR150 (trade name) according to that described in GB-B-2 196 876 comprising PTFE; FEP; P6 Sn alloy powder.

As may be seen from FIG. 2, the fatigue results of the inventive material (3) are very consistent regardless of applied load and somewhat better than material (4) especially at intermediate loads between 80 and 120 Mpa in that the degree of fatigue is no more or less.

However, when the wear results shown in FIG. 3 are viewed, it is. clear that the rate of wear of the inventive material at intermediate loads is significantly better than that of material (4), being only approximately one third of the wear rate. Wear is important since it determines when a bearing should be replaced or components scrapped. Consequently, the lower the wear rate the longer bearings and components utilising those bearings will last.

Thus it may be seen from the results that the material and method of the present invention provides a significant improvement in bearing properties over materials known in the art.

What is claimed is:

1. A method for the manufacture of a bearing material, the method comprising the steps of:

mixing an aqueous dispersion of polytetrafluoroethylene with 2 to 10 vol % of an aqueous dispersion of a melt-processable fluoro-polymer, 10 to 30 vol % of a particulate inorganic filler material and up to 5 vol % of a particulate ceramic material;

co-coagulating the PTFE and the melt-processable fluoro-polymer;

removing excess water; at least partially drying the wet co-coagulated material to provide an at least partially dried powder material;

spreading said at least partially dried powder material particles onto a substrate to form a bearing material layer;

compacting said layer;

drying said compacted layer to drive off residual liquid; and, sintering said dried, compacted layer at a temperature above the melting point of said PTFE constituent.

2. The method according to claim 1, wherein the substrate on which the at least partially dried powder material is spread is a metal strip having a porous layer into which the spread layer is impregnated.

3. The method according to claim 2 wherein the porous layer comprises bronze particles sintered to a metal backing.

4. The method according to claim 1, wherein the aqueous PTFE dispersion is in the form of unstabilised PTFE.

5. The method according to claim 1, wherein the constituents of the material are all mixed together simultaneously.

6. The method according to claim 1, wherein spreading the at least partially dried powder material onto a substrate to form the bearing material layer and compacting the layer further comprises extruding the mixture to form the layer configured as a monolithic tape or strip which is then dried and sintered.

7. The method according to claim 1, wherein the at least partially dried powder material has a further addition of a separate liquid lubricant material.

8. The method according to claim 1, wherein the wet coagulated material is substantially completely dried to form a powder.

9. The method according to claim 8 wherein the powder is mixed with a lubricant liquid prior to spreading onto the substrate.

10. The method according to claim 9 wherein the lubricant liquid is a hydrocarbon.

11. The method according to claim 1, wherein coagulation of the PTFE is caused by the small particle size of the ceramic particulate material, wherein the small particle size of the ceramic particuate material is less than 100 nanometers.

12. The method according to claim 1, wherein a separate coagulant material is added to the mixture.

* * * * *